UNITED STATES PATENT OFFICE.

HOMER W. JONES, OF CLEVELAND, OHIO, ASSIGNOR TO NATIONAL CARBON COMPANY, INC., A CORPORATION OF NEW YORK.

DRY-CELL CAN.

1,387,928.     Specification of Letters Patent.     Patented Aug. 16, 1921.

No Drawing.     Application filed December 22, 1919. Serial No. 346,776.

*To all whom it may concern:*

Be it known that I, HOMER W. JONES, a citizen of the United States, residing at Cleveland, in the county of Cuyahoga and State of Ohio, have invented a certain new and useful Improvement in Dry-Cell Cans, of which the following is a full, clear, and exact description.

The present invention relates to dry cell containers and more particularly to the tubular sheet zinc electrode which serves as a container for the other battery ingredients. In accordance with the present invention the container is manufactured without the use of a soldered side seam, and if desired the soldered seam at the bottom is also eliminated.

Electrodes for dry cells, as is well known, are made from sheet zinc which is rolled or bent into a tube of circular, rectangular or other form. The edges are lapped and then soldered together in an ordinary side seamer such as is used in the manufacture of various kinds of metallic containers. The bottoms also are usually of zinc although other metals such as tin plate or terne plate have been used or suggested at various times. The bottoms which are punched out of sheet metal are formed with a flange and the flange is soldered to the side by rolling through molten solder.

There are a number of disadvantages connected with the use of containers having soldered seams, especially soldered side seams, and it is the particular object of the present invention to eliminate the latter, although I may also eliminate the soldering of the bottom seam.

Specific discussion of some of the disadvantages of the soldered side seams will be given to illustrate the utility of the invention. Aside from the function of holding the edges together and preventing leakage of the electrolyte, the solder consisting of an alloy of lead and tin has no useful chemical function. In fact, the zinc container which is the consumable electrode preferably should consist of pure zinc as the presence of other metals is likely to produce electrocouples which will cause local action and useless consumption of the zinc. At the part of the cell where the seam occurs, or close to either side thereof, a corrosion line is almost invariably formed and the cam usually fails along this line. The action in some cases is believed to be due to the non-uniformity of the surface leaving a small pocket of electrolyte where the bibulous lining is not in contact with the zinc.

Another disadvantage is the thickness of the metal at the lapped portion of the can. The solder when sweated in and coated on the outside of the can increases the thickness at the joint to considerably more than twice the thickness of the sheet zinc. When slotted binding posts are applied to the edge of the cans to serve as terminals, care must be taken to avoid this lapped portion, as the slot of the binding post is too narrow to fit the lapped portion.

Other advantages of the improvement may be more readily illustrated in connection with the following description.

In accordance with the invention I join the edges of the can or tube without the use of solder or any metal other than the zinc of the sheet metal from which the can is formed. The weld may be either a lap weld or a butt weld, although in practice I have found the lap weld more satisfactory because of the mechanical difficulty in butt welding. Preferably the process used is the electric side seam welding process in which the edges will be lapped over slightly and the tube run through an electric side seam welding machine using alternating current of high amperage and low voltage. The apparatus commonly consists of a mandrel for the tube connected to one terminal of the circuit, and a roller connected to the other terminal, adapted to apply considerable pressure to the seam. The tubes may be run through the machine more rapidly than the soldering iron is ordinarily run over the seams in the soldering operation, and the operation is very quickly performed. With alternating current welding the surfaces of the zinc in contact with the roller and mandrel do not appear to be melted. Upon tearing apart the seam the inner surfaces of the lapped zinc appear to be melted and crystallized in small closely spaced spots which probably correspond to the peaks of the alternating current waves.

The cans show a lower proportion of leaks than soldered side seam cans and are more uniform and neater in appearance. While the mechanical strength of a perfectly soldered side seam may possible be greater than a side seam joined by my electrically produced autogenous weld, the average strength of the improved tubes is as great or greater than the soldered side seamed tubes.

I also find that the width of the zinc of the lapped edge may be decreased to about one-half the lap required in soldered side seam cans, which in large scale production results in an aggregate saving in zinc which amounts to a very large sum. In addition, the cost of the solder is entirely saved.

The thickness of the can at the seam is also decreased due to the elimination of solder, the squeezing out of some molten zinc from the iner surface of the lap and the compression of the zinc by the roller so that the slotted terminals may be fitted to the junction.

The elimination of the solder, the smoother surface of the interior of the welded zinc cans, or the absence of crystallization at the interior exposed zinc surfaces, or any or all of these, appear to be responsible for the decrease in corrosion at the seam which is obtained by the use of electrically welded cans.

My invention may also be applied to eliminate soldering the bottom to the tube, as the solder is disadvantageous in this connection in dry cells, although not in the same manner or to the same extent as in the case of the side seams. In the claims the term "edges joined by an autogenous weld" refers to joining the side edges of the sheet, or the bottom edges to the can bottom.

As far as I am aware it has been generally supposed that melting the zinc of a dry cell at any point would result in crystallization tending to accelerate the chemical action between the different forms of zinc, and produce local action. In soldering zinc cans or dry cells, care has always been taken to perform the soldering operation at the lowest temperature at which good soldering could be obtained, to prevent changes in the character of the zinc, which might produce local action; as anything which changes the physical character of zinc usually affects its electro-chemical and corrosion characteristics. As an example of a harmful effect due to non-uniformity of the zinc, I may refer to dry cells having mercury compounds in the lining or mix for amalgamating with zinc, which often fail on either side of the lapped soldered seam. This is believed by experts to be due to the rapid amalgamation of the more crystalline form of zinc produced near the seam by heating during the soldering operation. The thoroughly amalgamated strip of zinc is physically weaker and in addition local action may be set up with adjacent portions of the can. The heating, melting and subsequent crystallization of some of the zinc, which occurs in the electric welding in the present process, however, does not appear to have harmful effects. This may be accounted for by the fact that the crystallization caused by the melting does not extend through to the exposed surfaces, but only occurs on the contacting surfaces of the lapped edges of the zinc.

Having described my invention, what I claim is:—

1. In a dry cell, a zinc electrode consisting of a hollow sheet metal member having edges connected by an autogenous weld.

2. In a dry cell, a zinc electrode consisting of a sheet metal tube having the side edges connected by an autogenous weld.

3. In a dry cell, a zinc electrode consisting of a sheet metal container having an autogenous weld joining the side edges and an autogenous weld joining the bottom edges to the bottom of the container.

4. A zinc electrode for dry cells consisting of a hollow sheet metal member having lapped edges connected by a continuous autogenous weld, comprising a plurality of closely spaced spots of melted zinc subsequently solidified said spots being located on the contacting surfaces of the lapped edges.

In testimony whereof, I hereunto affix my signature.

HOMER W. JONES